US005370545A

United States Patent [19]
Laurent

[11] Patent Number: 5,370,545
[45] Date of Patent: Dec. 6, 1994

[54] PROCESS AND DEVICE FOR THE ELECTRICAL INTERCONNECTING OF EQUIPMENTS SUCH AS WELL TOOLS

[75] Inventor: Jean Laurent, Orgeval, France

[73] Assignee: Institut Francias Du Petrole, Rueil-Malmaison, France

[21] Appl. No.: 225,925

[22] Filed: Apr. 11, 1994

Related U.S. Application Data

[63] Continuation of Ser. No. 989,579, Dec. 11, 1992, abandoned.

[30] Foreign Application Priority Data

Dec. 11, 1991 [FR] France .................. 91 15483

[51] Int. Cl.$^5$ .................................. H01R 4/60
[52] U.S. Cl. ............................ 439/190; 439/194; 166/65.1; 285/907
[58] Field of Search ............ 285/3, 907; 166/65.1; 439/190, 191, 194, 195, 207–210, 212, 213

[56] References Cited

U.S. PATENT DOCUMENTS

| 2,748,358 | 5/1956 | Johnston | 439/194 |
| 3,465,111 | 9/1969 | Breslin | 439/194 X |
| 4,042,291 | 8/1977 | Moriyama | 285/907 X |
| 4,204,188 | 5/1980 | Weichart et al. | 439/194 X |
| 4,753,291 | 6/1988 | Smith et al. | 166/65.1 |
| 4,874,328 | 10/1989 | Le Dall et al. | 439/278 |
| 4,877,089 | 10/1989 | Burns . | |
| 4,941,349 | 7/1990 | Walkow et al. | 439/194 X |

FOREIGN PATENT DOCUMENTS

| 0296788 | 12/1988 | European Pat. Off. . |
| 2544376 | 10/1984 | France . |
| 2593292 | 7/1987 | France . |
| 2613496 | 10/1988 | France . |
| 2656034 | 6/1991 | France . |
| 2072792 | 10/1981 | United Kingdom . |

Primary Examiner—Khiem Nguyen
Attorney, Agent, or Firm—Antonelli, Terry, Stout & Kraus

[57] ABSTRACT

Electric interconnecting cables fitted with sealed electric connectors resistant to pressure are most often used to connect electrically together various equipments (1) distant from one another and immersed in a conducting liquid such as may be encountered in wellbores. To avoid this relatively costly solution, a process is proposed, wherein the various equipments (1) are linked together through sealed and empty hydraulic pipes or cables (22), so as to form a common space insulated from the external environment, and the electric linking conductors (25) are passed inside the hydraulic cable circuit constituted thereby.

14 Claims, 3 Drawing Sheets

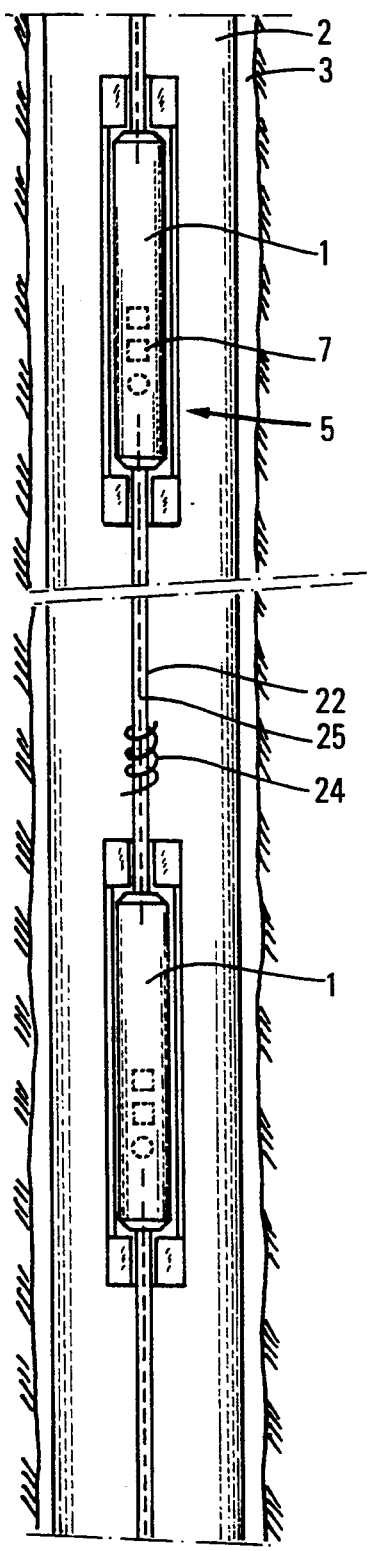
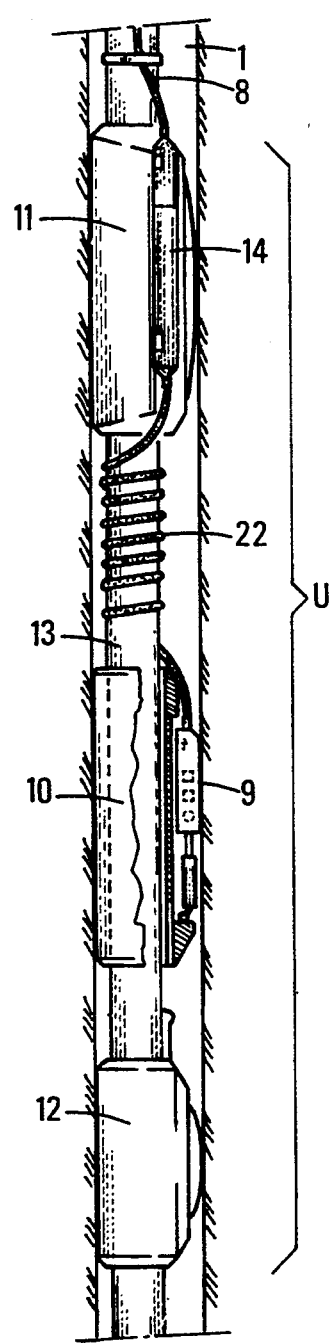
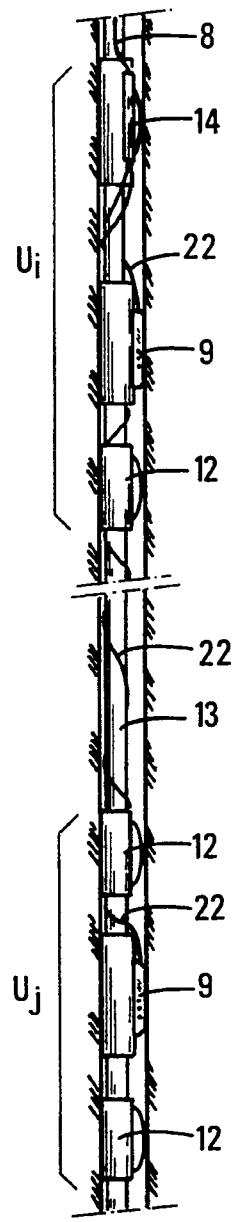
FIG.1
FIG.3
FIG.3A

FIG.2
FIG.2A
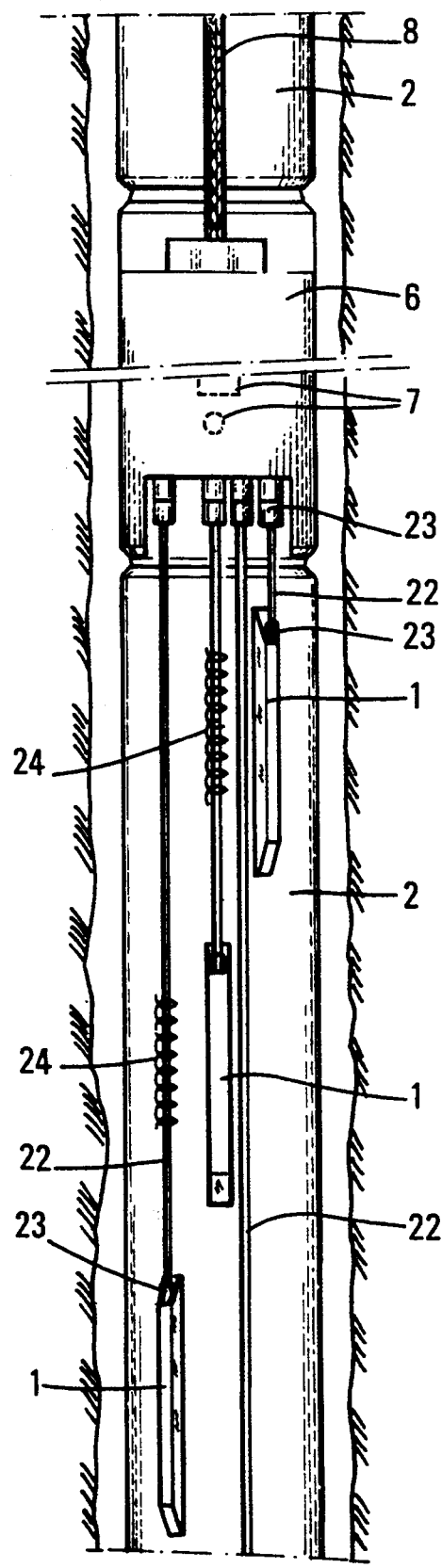
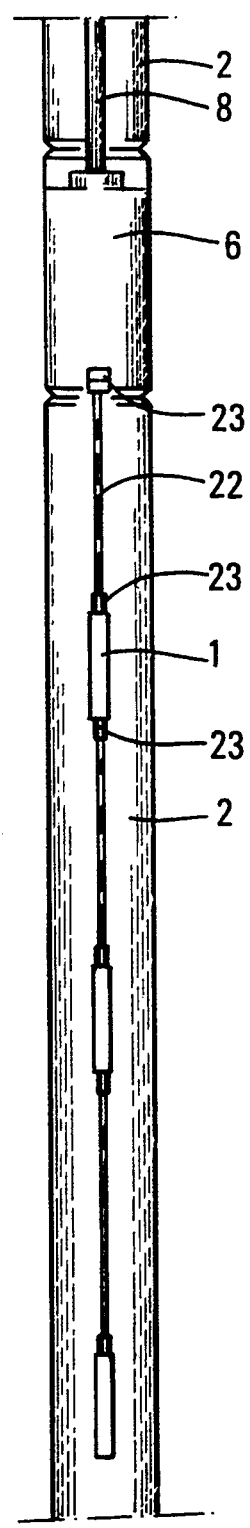

PROCESS AND DEVICE FOR THE ELECTRICAL INTERCONNECTING OF EQUIPMENTS SUCH AS WELL TOOLS

This application is a continuation application of application Ser. No. 07/989,579, filed Dec. 11, 1992, now abandoned.

FIELD OF THE INVENTION

The present invention relates to a process and to a device for interconnecting electrically equipments located in a conducting environment and distant from one another, particularly in a liquid possibly under pressure, as well as a reception system implementing the process.

The process in accordance with the invention may for example be applied to the field of seismic prospecting in wells.

BACKGROUND OF THE INVENTION

Seismic prospecting operations in wells or wellbores imply the setting of an array of sensors such as geophones and the acoustic coupling thereof with the formations surrounding the well. The sensors are preferably arranged at various successive depths and linked to a surface installation through cables. The acoustic or seismic signals received by the sensors in response to the emission of seismic waves in the ground, following reflections on the subsoil discontinuities, are transmitted through the cables to a surface recording station. French patent applications FR-2,593,292 (U.S. Pat. No. 4,775,009) and 2,642,849 (U.S. Pat. No. 4,986,350) mention a well-known technique for setting stationary sensors in a well fitted with a casing held up by cementing. The sensors are fixed to the outside of the casing before it is lowered into the well, the linking cables running along the outer wall thereof, and the whole of the reception device with the cables is embedded in the cement that is then injected into the annular space between the well and the casing. An electronic preamplifying and filtering module may be associated with the sensors of a single level. The sensors and the modules thereof may be included in protection boxes arranged along casing sections or included in fittings between the successive casing sections, as described in patent application FR 91/11,536.

A well-known solution for connecting electrically together several boxes such as those mentioned above consists of using sealed electric connecting elements. These connecting elements generally comprise a connecting sleeve fitted with mechanical fastening means for a linking cable, a single- or multi-pin electric connector to connect all the lines of the cable, comprising sealed crossings for the various lines, and mechanical connecting means fitted with seal gaskets for fastening the sleeves to each box. An example of a connecting element, both mechanical and electric, between a well sonde and a multicore cable, is described for example in patent FR-2,615,044 (U.S. Pat. No. 4,874,328). Because of the relative complexity thereof, these elements can hardly be used to interconnect a large number of reception units such as those mentioned above. Difficulties and operating costs grow rapidly as the number of units increases because the number of sealed interfaces has to be increased at the level of the interconnections between them and the cable elements, in order to keep the inner space of each reception unit closed and electrically insulated.

SUMMARY OF THE INVENTION

The process in accordance with the invention enables the electric interconnection of several equipments located at a distance from one another in closed boxes or bodies to be achieved, while avoiding the drawbacks mentioned above.

It is characterized in that the various equipments are electrically interconnected by means of hydraulic sealed pipes or cables, so as to link together the inner spaces of the various boxes or bodies, and electric linking conductors are passed through said hydraulic pipes or cables.

This linking mode may be applied to the electric interconnection of equipments that are already connected through a hydraulic power transmitting circuit and, in this case, another sealed link is established between them through empty hydraulic cable(s) or pipes to allow conducting wires to pass through.

The process may for example be applied to the electric interconnection of several acoustic or seismic reception units arranged in closed boxes or bodies, at a distance from one another, along a well or wellbore, and which are interconnected by means of sealed hydraulic pipes or cables of the hydraulic type capable of withstanding the pressure prevailing in the well through which the electric linking conductors are passed.

According to one embodiment, said units being fastened to the outside of a casing intended to be set into a well and held up through the injection of cement in the annular space between the casing and the well, said units are linked through empty and sealed hydraulic pipes capable of withstanding the cement injection pressure, the electric linking conductors passing through these cables or pipes.

According to another embodiment, said units being associated with a tubing producing petroleum effluents lowered in the well and being arranged in the annular space around said tubing at various depth levels, said units are interconnected by means of hydaulic pipes or cables running along said annular space.

According to another embodiment, said units being well sondes in a multi-sonde array comprising a main sonde linked to a surface installation by an electric-carrying cable and at least one satellite sonde, all the electric conductors associated with said units in the satellite sondes are concentrated in the main sonde by passing them through an empty and sealed circuit consisting of hydraulic sealed cables or pipes linking the various sondes of the array together.

The process in accordance with the invention is particularly advantageous when there is a large number of units to be linked with one another. Hydraulic cables provided with sealed connectors at the ends thereof, are commonly used. It is therefore possible to set up by means of these circuits, at a lower cost, an empty common space insulated from the outer environment, where it is possible to circulate without any particular protection various electric conductors for transferring the signals picked up by the receivers in the various units and possibly the power supply to electronic devices arranged in the sealed boxes containing the various units.

The invention further relates to a device for interconnecting electrically at least two acoustic or seismic reception units arranged in closed boxes or bodies at a distance from one another, along a well or wellbore.

These units may be already connected to one another through an independant hydraulic power transfer circuit. This device comprises at least one hydraulic sealed pipe or cable, hydraulic connecting means to connect said pipe, at the two opposing ends thereof, to the boxes of said units, so as to communicate the inner spaces of said boxes with one another, and conducting wires passing along said pipe of the hydraulic type to connect said units with one another.

According to one embodiment, the boxes contain means for picking up signals, and the conducting wires passing through each pipe of the hydraulic type are lines for transmitting the signals received by said sensors.

The invention also relates to an acoustic or seismic reception system in a well, comprising in combination at least two units in boxes at distinct well depths, each one arranged in a closed box or chamber, at least one empty and sealed hydraulic pipe or cable fitted at the two opposing ends thereof with hydraulic connecting means for connecting said pipe to the boxes of said units, so as to communicate the inner spaces of said boxes with one another, and conducting wires passing along said empty and sealed pipe so as to connect said units with one another.

According to one mode of implementation of the system, the units are sondes containing sensors and arranged outside a tubing set in the well.

Said units may also be sondes in a multi-sonde array lowered into the well.

For seismic prospecting applications for example, it is possible to set up, under acceptable economic conditions, a very large array for the reception of acoustic or seismic signals in one or several wells in order to test or to control the development of an oil deposit before or during its bringing in.

The units are for example sondes containing sensors and/or electronic elements arranged outside a casing set in the well.

According to one implementation example, the system in accordance with the invention comprises a surface control and recording station, a main reception unit connected to the surface station through an electric-carrying cable and containing means for adapting and transmitting signals on said cable, and at least one secondary unit linked to the first unit by a sealed hydraulic cable through which pass electric conductors coming from at least one secondary reception unit.

The system may comprise several secondary reception units, the electric conductors coming from all said secondary units passing through at least one empty and sealed circuit of the hydraulic type interconnecting the various reception units in series or in parallel.

BRIEF DESCRIPTION OF THE DRAWINGS

Other features and advantages of the method, the device and the system in accordance with the invention will be clear from reading the description hereafter of embodiments given by way of non limitative example, with reference to the accompanying drawings in which:

FIG. 1 shows an application of the invention for the interconnection of stationary acoustic or seismic reception units located in the annular space between a well and a casing;

FIG. 2 shows a similar lay-out where at least one of the reception units is arranged in a special fitting between two lengths of a casing and connected through several different hydraulic cables to several secondary reception units;

FIG. 2A shows a variant of the previous lay-out with a connection in series of the secondary units to a main unit;

FIG. 3 shows another application of the invention for the interconnection of the elements of a stationary reception unit installed around a tubing lowered in a well for its bringing in;

FIG. 3A diagrammatically shows another variant where several secondary units are connected in parallel to a main unit;

DESCRIPTION OF THE PREFERRED EMBODIMENTS

Figure 4:
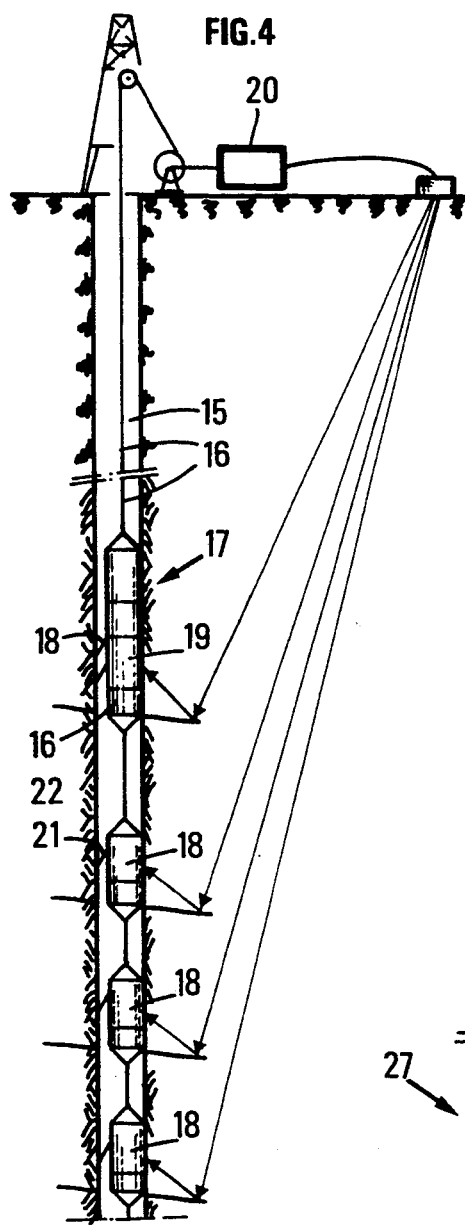
FIG. 4 shows another application of the invention for the interconnection of the sondes of a multi-sonde array adapted for being lowered into a well or wellbore.

The process for interconnecting several units through the combination of electric connections in hydraulic connections, in accordance with the invention, is generally suited for interconnecting equipments placed in a conducting environment at a distance from one another and allows electric links to be established between them. More particularly, it may be used for various applications in oil production or exploration wells.

The interconnection process which will be described hereafter may be used for example within the scope of a well monitoring system such as described in patents FR-2,593,292; 2,642,849 and in patent application FR-91/11,536 all cited above. Such a system comprises (FIG. 1) a plurality of acoustic or seismic reception units 1 arranged at a distance from one another outside a casing 2. This casing is to be set in a wellbore 3 and held up through the injection of cement in the annular space 4 between the casing and the well. The units contained in sealed boxes are inserted in protection housings 5 arranged on the outer wall of certain casing sections. Sensors such as geophones 7 and/or electronic amplifying and filtering modules are arranged in these reception units. The units must be interconnected with one another and with a surface control and recording installation (not shown).

As it is described in the above-cited patent application, one or several reception units may also be included in specially adapted casing fittings which comprise housings for one or several geophones and/or for electronic modules. FIG. 2 shows a lay-out comprising a main reception unit 1 included in a casing fitting 7 and linked to a surface installation by an electric-carrying cable 8 as described in said patent application. Several secondary boxes 1 analogous to those in FIG. 1 are arranged against the outer wall of the casing and at various depths. Application of the process in accordance with the invention may allow each one of them to be connected to the main unit 6 through a specific link. According to the variant of FIG. 2A, the secondary units 1 may also be connected in series to the main unit.

The process in accordance with the invention may also be used to achieve a seismic reception device adapted to be used as a stationary device outside a tubing for producing petroleum effluents, as described in the published French Patent Application FR-2,656,034. Such a device comprises for example (FIG. 3) a reception unit U including a mobile sonde 9 that may be moved away from a support 10 and closely lean against the wall of a well or of a casing. Support 10 is held between two shoes 11, 12 fastened to a tubing 13. An electronic box 14 for amplifying the signals received by the sensors of the sonde and possibly for sensors in other units located lower on tubing 13 is fastened to the upper shoe 11. The purpose of such an application is to connect together various sensors and electronic modules for example. According to the variant in FIG. 3A, the sondes 9 of two reception units Ui, Uj arranged in distinct locations along the tubing are connected through separate links to a single electronic box 14.

Figure 5:
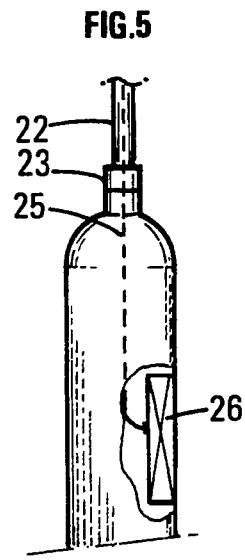
FIG. 5 diagrammatically shows a signal receiver in a unit whose conducting wires pass through a hydraulic cable linking this unit to another one.

The process in accordance with the invention may also be suited for example to the electric interconnection of well sondes such as those used in seismic prospecting operations. An acquisition system comprising a main tool or sonde 17 under which is suspended one sonde or several satellite sondes 18 is lowered into a wellbore 15 at the end of a multi-function electric-carrying cable 16. Acoustic or seismic wave receivers 26 (FIG. 5) and/or various sensors are arranged in the main sonde 17 and in the satellite sondes 18. The acoustic receivers are, for example, geophones adapted for picking up signals along one or several axes. An acquisition array is arranged in a compartment 19 of the main sonde for example to acquire the signals coming from the sensors, to digitize and transmit them in coded form to a central surface station 20 (FIG. 4) by means of transmission lines included in the electric-carrying cable 16. A hydraulic system (not shown) is arranged in a compartment of the main sonde. It is electrically supplied through lines of cable 16 and operates to order hydraulic jacks connected to anchoring arms 21. Opening of these arms makes it possible to press the body of the main sonde 17 and, in some cases, the bodies of the satellite sondes 18, against the wall of the well, so as to couple the various seismic receivers with the formations crossed by the well. Devices of this type are for example described in the following French patents FR-2,501,380; 2,548,727; 2,564,599; 2,613,496; 2,632,010; 2,636,741; 2,616,230.

The process in accordance with the present invention, which is described hereafter, makes it possible, in all the applications mentioned above, to establish in a simple and little costly way the electric connections necessary for connecting together elements such as sensors or electronic modules for example, contained in various units of any reception array for wells.

The process in accordance with the invention firstly comprises establishing links between the various units 1, 6 (FIGS. 1, 2), 9, 14 (FIG. 3), 17, 18 (FIG. 4) by means of hydraulic cable portions 22 capable of withstanding the pressure prevailing in the well, each one of them being fitted at each end thereof with a hydraulic connector 23 provided with seal gaskets. Such cables are common and relatively little costly. Fasteners (not shown) hold up these cables in relation to the wall of casing 2 (FIGS. 1, 2) or of tubing 13 (FIG. 3). Compensation means 24 diagrammatically shown in FIGS. 1 to 3 allow the effects of the expansion of the tubing or of the casing to be compensated. This compensation may be achieved by helical winding of the hydraulic cables on the tubing or the casing.

This interconnection of hydraulic cables and of sondes thus allows a continuous space linking the various units together to be constituted, this space being wholly insulated from the outside pressure over the total length thereof.

The process in accordance with the invention further comprises (FIGS. 1 to 3) using this continuous hydraulic circuit constituted by the interconnection of cable portions, and which is insulated from the external environment, to pass therethrough electric conductors 25 associated with each reception element 26 (FIG. 5) up to other units of the reception array, in order to group them together with others and/or to interconnect them. By means of this hydraulic circuit, the electric conductors of the sensors arranged in the lower units 1 (FIGS. 2, 3A) can be driven up towards the upper unit 6 or possibly towards the surface installation 20 (FIG. 4) if it is not too distant therefrom. It is also possible, by means of the hydraulic circuit, to connect the sensors of sonde 9 (FIG. 3) to the electronic box 14 of the same reception unit U or of another unit Ui (FIG. 3A). By means of the hydraulic circuit, it is also possible to connect the sensors in an array of satellite sondes 18 (FIG. 4) to an acquisition array arranged for example in the main sonde 17.

The connections achieved may be direct connections, the linking wires 25 being in this case unbroken. The electric connections may also be relayed one or several times (FIGS. 6, 7) by relay elements. According to the connection mode in FIG. 7, a main reception unit 27 may centralize electric conductors 25 from one or several secondary units, which are connected thereto by one or several hydraulic cable elements 22. These conductors are grouped together on passive electric connectors 28. This main unit 27 itself may be connected to a unit of higher concentration by other hydraulic cables.

Figure 6:
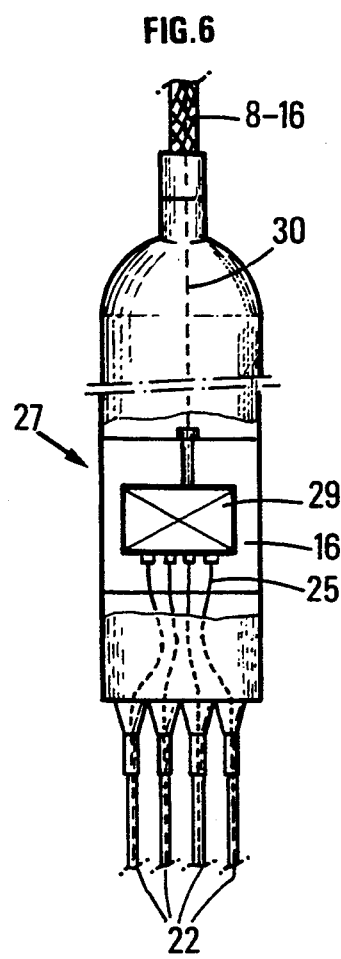
FIG. 6 shows a unit containing a signal acquisition module to which the conducting wires coming from sensors in other sondes are connected.
Figure 7:
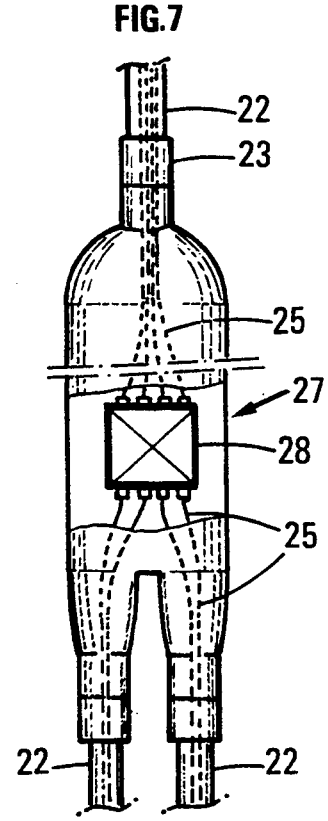
FIG. 7 diagrammatically shows a relay element in an intermediate unit of an array, allowing the transmission lines coming from signal receivers to be grouped together.

According to the connection mode in FIG. 6, a reception unit 27, and particularly that which is located at the head of the various reception units, may contain for example an electronic module 29 for adapting the signals received from other units before the transmission thereof. The signals may be transmitted directly in their analog form on various lines 28 of the electric-carrying cable (8, 16). When justified by their number or by the transmission distance, an electronic module 29 adapted for multiplexing and for coding the signals is arranged in the sonde or upper reception unit; a conventional logging cable of the heptaconducting type may for example be used in this case.

The connecting device in accordance with the invention is preferably used to connect together reception units located in a single area, connections between unit groups distant from one another or from a surface control and recording station being preferably achieved by means of lines of a multicore cable.

In all cases, the electric circuits are insulated from the external environment over the total length of the sealed hydraulic circuits.

In an application such as that of FIG. 3, where hydraulic power is delivered by a hydraulic system from the main sonde 17 to supply jacks located in the satellite sondes 18, other distinct hydraulic circuits are used to connect the sondes together.

I claim:

1. A device for electrically interconnecting at least two acoustic or seismic reception units arranged in closed boxes or bodies and at a distance from one another along a well and protecting the same from an outside electrically conducting or pressurized medium, said units being linked by at least one hydraulic pipe or cable to transmit hydraulic power between said units, comprising at least one other empty and sealed hydraulic pipe or cable, said empty and sealed pipe being fitted with hydraulic connection means for connecting said empty and sealed pipe, at two opposing ends thereof, to the boxes of said units, to form a common inner space isolated from said medium with at least a part of inner spaces of said boxes containing said units, and electrically conducting wires passing along said at least one other empty and sealed pipe to electrically connect said units.

2. A device as claimed in claim 1, wherein said boxes contain means for picking up signals, the conducting wires passing through each empty hydraulic pipe comprising conducting lines transmitting the signals received by said means.

3. A process for electrically interconnecting several acoustic or seismic reception units arranged in closed boxes or bodies at a distance from one another along a well and for protecting the units from an outside electrically conducting or pressurized medium in the well, said process comprising:

interconnecting said units with at least one hydraulic pipe or cable for transmitting hydraulic power between said units;

positioning at least one other empty hydraulic sealed pipe or cable between said units and fitting each of opposing ends of the at least one other empty hydraulic pipe or cable with hydraulic connection means for connecting said at least one other empty hydraulic sealed pipe or cable at said opposing ends to the boxes of said units to link together said closed boxes or bodies, and to form a common inner space isolated from said medium; and electrically interconnecting said units by electric conductors passing along said at least one other empty hydraulic sealed pipe or cable.

4. A process as claimed in claim 3, further comprising fastening said units to an outside of a casing intended to be set in the well and holding the units in place by injecting cement under pressure in an annular space between the casing and the well; said empty and sealed hydraulic pipes or cables being capable of withstanding cement injection pressure.

5. A process as claimed in claim 3, further comprising associating said units with a tubing for producing petroleum effluents lowered in the well and arranging the units in an annular space around said tubing at various depth levels within the well.

6. A process as claimed in claim 3, wherein said units are included in well sondes in a multi-sonde array including a main sonde linked to a surface installation by electric-carrying cable, and at least one satellite sonde, said process further comprising interconnecting said at least one satellite sonde to said main sonde by an empty and sealed circuit made of the sealed hydraulic pipes or cables and passing electric conductors between said satellite and main sonde through said empty circuit.

7. An acoustic or seismic reception system in a well comprising at least two reception units positioned in operation at various depth levels in the well, each arranged in a closed box or chamber, at least one empty and sealed hydraulic pipe or cable fitted at opposite ends thereof with hydraulic connection means for connecting said empty pipe or cable with said closed boxes of the units to form a common inner space, isolated from an outside electrically conducting or pressurized medium, with the inner spaces of said boxed, and electrically conducting wires passing along said at least one empty and sealed hydraulic pipe or cable to electrically interconnect said units, said units thereby being protected from the outside electrically conducting or pressurized medium in said well; and a control and recording surface station, a main reception unit connected to the surface station by an electric-carrying cable and containing means for adapting and for transmitting signals on said cable, and at least one secondary reception unit linked to the main reception unit by the at least one empty and sealed hydraulic pipe or cable, with electric wires coming from the at least one secondary reception unit passing therealong.

8. A system as claimed in claim 7, comprising several secondary units, the electric wires coming from all of said secondary units passing through at least one single sealed and empty hydraulic circuit cable or pipe interconnecting in series said secondary units so as to form a common inner space isolated from said medium.

9. A system as claimed in claim 7, comprising several secondary reception units, electric wires electrically connecting each of said secondary units to at least one other reception unit passing along at least one empty hydraulic cable.

10. A system as claimed in claim 7, wherein said units are sondes containing sensors and/or electronic elements, arranged outside a tubing for producing petroleum effluents in the well.

11. A system as claimed in claim 7, wherein said units are sondes of an array of sondes lowered in the well.

12. A system as claimed in claim 11, comprising at least one other cable or conduit for interconnecting said sondes.

13. A system as claimed in claim 11, comprising at least one hydraulic cable for transmitting hydraulic power between said sondes.

14. A system as claimed in claim 7, wherein said units are sondes containing sensors and/or electronic elements arranged outside a casing set in the well.

* * * * *